United States Patent [19]
Bassett et al.

[11] Patent Number: 5,129,282
[45] Date of Patent: Jul. 14, 1992

[54] MECHANISM FOR SELECTIVELY REPOSITIONING A FARM IMPLEMENT

[75] Inventors: James H. Bassett, Sycamore; Robert E. Boyle, Jr., DeKalb, both of Ill.

[73] Assignee: Dawn Equipment Company, DeKalb, Ill.

[21] Appl. No.: 735,298

[22] Filed: Jul. 24, 1991

[51] Int. Cl.$^5$ ............................................. G05G 13/00
[52] U.S. Cl. .................................... 74/529; 172/99; 172/230; 172/332; 172/705
[58] Field of Search ............... 74/510, 527, 529; 172/99, 140, 230, 332, 346, 347, 348, 373, 468, 661, 683, 705

[56] References Cited

U.S. PATENT DOCUMENTS

| | | | |
|---|---|---|---|
| 353,491 | 11/1886 | Hepworth et al. | 172/468 |
| 1,158,023 | 10/1915 | Beaver | 172/661 |
| 2,925,872 | 2/1960 | Darnell | 172/661 |
| 3,058,243 | 10/1962 | McGee | 172/661 |
| 3,543,603 | 12/1970 | Gley | 74/529 X |
| 3,906,814 | 9/1975 | Magnussen | 74/529 X |
| 4,018,101 | 4/1977 | Mihalic | 74/493 |
| 4,643,043 | 2/1987 | Furuta et al. | 74/503 |

FOREIGN PATENT DOCUMENTS

| | | | |
|---|---|---|---|
| 54-57726 | 5/1979 | Japan | 74/529 |
| 0611201 | 6/1978 | U.S.S.R. | 74/527 |

*Primary Examiner*—Richard Lorence
*Assistant Examiner*—William C. Trousdell
*Attorney, Agent, or Firm*—Wood, Phillips, VanSanten, Hoffman & Ertel

[57] ABSTRACT

A mechanism for adjusting the height of a farm implement/tool of the type to be carried by a drawing vehicle includes a connector for supporting a farm implement/tool in an operative position. A guide directs sliding movement of the connector selectively between first and second positions corresponding to raised and lowered positions for a farm implement/tool which is carried by the connector. A mount connects the guide to one of a drawing vehicle and a support to be carried by a drawing vehicle. A lock fastens the connector in one of the first and second positions and selectively releases the connection to allow the connection to be slid into the other of the first and second positions therefor.

25 Claims, 3 Drawing Sheets

MECHANISM FOR SELECTIVELY REPOSITIONING A FARM IMPLEMENT

FIELD OF THE INVENTION

This invention generally relates to farm implements/tools and, particularly, to a mechanism for safely and efficiently adjusting the height of a farm implement relative to a drawing vehicle.

BACKGROUND OF THE INVENTION

Farmers who are interested in conserving valuable topsoil from wind and water runoff erosion generally leave more crop residue on the soil surface than is typically left by a conventional moldboard plow. Methods of leaving more crop residue on the soil surface include conventional tillage using a chisel plow, no till and ridge-till equipment as opposed to the conventional moldboard plow.

While increasing surface residue reduces soil erosion, many other field operations become more difficult. Most farm equipment such as planters, cultivators, fertilizer application equipment, etc. is designed to operate in fields prepared by conventional moldboard plow tillage. Such types of equipment have difficulty handling the additional crop residue left to conserve the valuable topsoil, especially in high-yield midwestern corn and soybean farming Corn planters used in a field with even moderate amounts of surface residue do not work properly and cause poor seed placement, germination and ultimately reduce yield and profit. The crop residue "hairpins" around the planter parts, lifts the planter, and interferes with banding of insecticides, herbicides, etc.

The above-described problems with residue have resulted in the use of various types of "row cleaning devices". Row cleaning devices mount in front of the planter to clean the residue out of the path of the planter, cultivator, fertilizer applicator or other devices.

In some applications such as no-till, ridge-till, or even conventional tillage, there are cases when it is advantageous to be able to lift the row cleaning device, residue removal system, etc. to a secondary higher elevation. The need to raise the row cleaning device is common in ridge-tilled fields where the headlands at each end of the field are not ridged (so tractors, combines and trucks do not need to cross ridges) and requires a different height setting of the tool.

As farms become larger and consist of many scattered noncontiguous fields, equipment becomes larger (more rows per implement) and there is a need for a means of quickly, simply and accurately raising and lowering often a very large number of farming tools drawn by the tractor.

Some tools on the market provide a relatively fine threaded or multi-hole pinned height adjustment to set the depth of soil engagement for the tool while working. Multi-row machines often have 12, 16, 24 or more separate row units on a single tool bar. Raising and lowering the tools for these machines can become a significant efficiency factor in the overall operation of a farm. The loss of time in raising and lowering tools accumulates and becomes extremely significant in the relatively short available planting and harvesting seasons.

For example, if each tool on a 16-row planter is raised to do the headlands and then lowered to do the ridges on a neighboring field, and it takes an average of 2 minutes per row to get to the adjustment and either raise or lower it using the threaded or pinned fine depth adjustment, that means 32 minutes will be spent raising the 16 units to do the headlands and 32 minutes to lower the same 16 units.

This is a total of 1 hour and 4 minutes adjusting tool height every time the planter operator goes from one field to another. On a larger planter the time loss is even greater. During the planting season this time is critical. A 16 row planter at 6 mph could plant over 26 acres in the time spent adjusting the tool height.

Further, raising and lowering the height of multi-row machines is also time-consuming, tedious and repetitive. Repetitive operations are often the cause of farm accidents. For example, requiring an operator to repeatedly place himself beneath a raised implement to repin a multi-pinned height adjustment may increase the likelihood of accident and injury.

Further, the tools must be manually elevated and shifted to align holes to insert pins for desired height selection The pins are prone to being lost, whereupon the tool cannot be fixed at the desired height.

The process of readjusting the height of 16 row units from a given depth setting to another setting and then back to the original setting is likely to result in misadjustment of the tool a certain percentage of the time. Misadjustment may cause poor tool performance, row plugging, and further delays.

SUMMARY OF THE INVENTION

This invention is directed to solving the above noted problems and dilemmas and satisfying the above and other needs in this field.

A mechanism for adjusting the height of a farm implement/tool of the type to be carried by a drawing vehicle includes a connector for supporting a farm implement/tool in an operative position. A guide directs sliding movement of the connector selectively between first and second positions corresponding to raised and lowered positions for a farm implement/tool which is carried by the connector. A mount connects the guide to one of a drawing vehicle and a support to be carried by a drawing vehicle. A lock fastens the connector in one of the first and second positions and selectively releases the connection to allow the connection to be slid into the other of the first and second positions therefor.

A further feature of the invention is the provision of a guide which guides the connector in translation between the first and second positions therefor.

Still a further feature of the invention is the lock including a rotatable shaft on the connector and a pin and slot, one each on at least one of the rotatable shaft and connector and guide In one form, the pin and slot are engaged and disengaged by rotation of the shaft through less than 360°.

Accordingly, implements/tools can be simply, safely and rapidly raised and lowered. To lower the implement/tool, one need only press down the shaft and effect a partial turn thereof The invention contemplates that such an arrangement can be used to set the implement/tool at any number of different heights.

Still a further feature of the invention is a spring which biases the connecting means to one of the first and second positions therefor, and preferably the raised position. To raise the implement/tool, one need only effect a partial turn of the shaft which allows the spring to drive the implement/tool upwardly. Upward movement is limited by a stop arrangement so that the implements/tools are consistently located in a raised position therefor.

With the inventive structure, a 16-row implement can be raised or lowered to exactly the same position in less than 20 seconds per row - 5 minutes total. This represents an improvement of at least 10-1 over prior art mechanisms known to the inventor herein.

Yet another feature of the invention is a mount which includes a mounting plate and first and second brackets extending transversely from the mounting plate. The guide includes a slot/channel in at least one, and preferably in each, of the first and second brackets for receiving a pin fixed to the connector to guide movement of the connector and implement/tool thereon between its raised and lowered positions.

Another feature of the invention is a connector including a mechanism for fine adjusting the height of the tool around the raised and lowered positions. The fine adjust mechanism includes a threaded rod A cap, for effecting manual adjustment, is attachable to one end of the threaded rod. A first elongate tube has a connector at one end thereof for receiving the one end of the threaded rod. A portion of the one end of the threaded rod extends from the one end of the first tube for engagement with the cap. A second elongate tube is slidably received in the first tube and has a nut/threaded bore in one end thereof for engaging the threaded rod. An opposite end of the second tube is connected to an implement/tool. Rotation of the cap changes the height of the tool. Fine settings can be preselected, locked and thereafter consistently returned to after repeated raising and lowering of the farm implements/tools.

Another important feature of the invention is the ability to adjust the height of the implements/tools with the support therefor in a lowered position. Therefore, the individual effecting adjustment of the implements/tools need not situate him or herself dangerously beneath any part of the equipment to effect those adjustments.

Further, the spring loading of the implements/tools towards a raised position obviates the need to have to manually lift what are often heavy implements/tools. This avoids user fatigue and potential injury, particularly to the back when repeated adjustments are carried out.

At the same time, with the present invention, the implements/tools are positively held in their raised and lowered positions.

Further features and advantages of the invention will readily be apparent from the specification and from the drawings.

DETAILED DESCRIPTION OF THE PREFERRED EMBODIMENT

Figure 1:
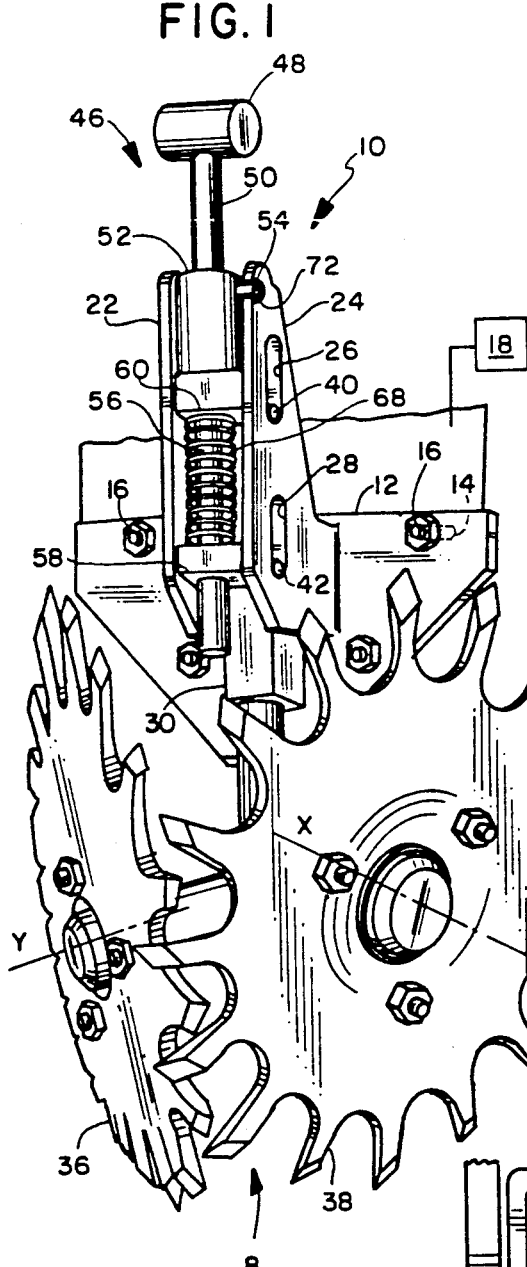
FIG. 1 is perspective view of a row cleaning apparatus showing a height adjusting mechanism, according to the present invention, and with the row cleaning apparatus in a lowered position.
Figure 2:
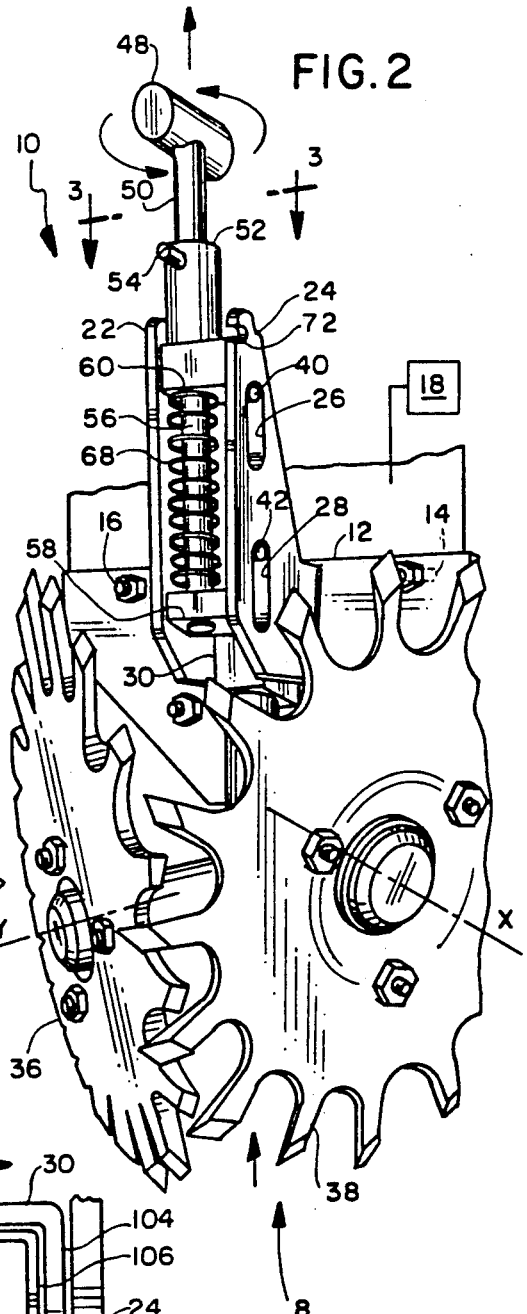
FIG. 2 is a view as in FIG. 1 with the row cleaning apparatus in a raised position.
Figure 3:
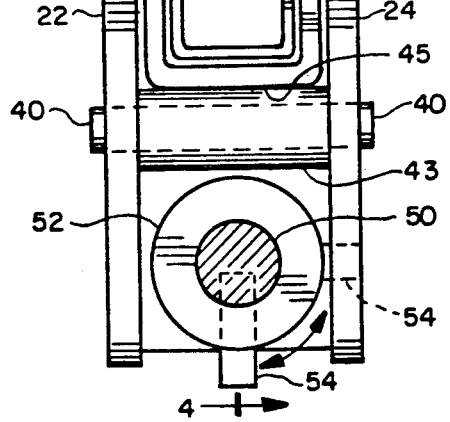
FIG. 3 is a cross-sectional view of the inventive height adjusting mechanism taken along line 3—3 of FIG. 2.

FIGS. 1 and 2 show a row clearing implement at 8 with a height adjusting mechanism 10, according to the present invention, shown therein in lowered and raised positions, respectively. The height adjusting mechanism 10 includes a mounting plate 12 with mounting holes 14 for receiving fasteners 16 for attaching the height adjusting mechanism 10 to a support or a drawing vehicle 18, for example a tractor.

First and second L-shaped, laterally spaced side brackets 22, 24, respectively, project in cantilever fashion from the mounting plate 12. The first and second side brackets 22, 24, respectively, each include upper and lower elongate guide slots/channels 26, 28, respectively, and define a line of movement for an implement connecting means 30. The implement connecting means 30 carries at its lower end the aforementioned row clearing apparatus 8, which, in the embodiment shown, is made up of first and second toothed wheels 36, 38, respectively, rotatable about transverse axes X, Y. This style of implement 8 is only exemplary, as the invention contemplates use with many different types of implements.

The wheels 36, 38 are selectively and simultaneously vertically moveable with respect to the L-shaped brackets 22, 24 in the path defined therebetween.

Figure 4:
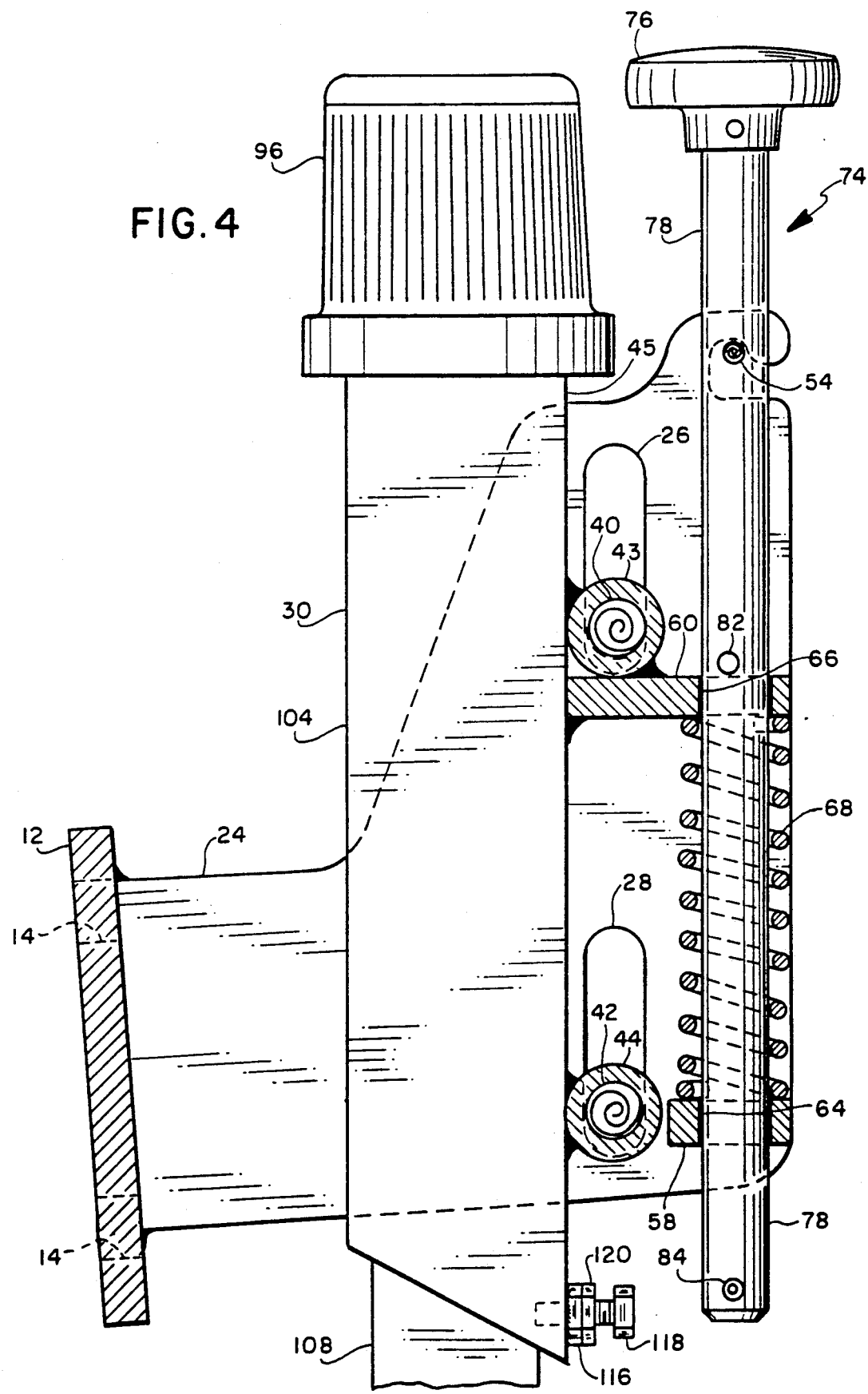
FIG. 4 is a cross-sectional view of the height adjusting mechanism taken along line 4—4 of FIG. 3.

Upper and lower guide pins 40, 42, respectively, extending from the implement connecting means 30, project into the upper and lower channels 26, 28, respectively, in the L-shaped brackets 22, 24 to guide movement of the connecting means 30 and the implement/tool 8 along a vertical line. The upper and lower guide pins 40, 42, respectively, are received in upper and lower sleeves 43, 44, respectively, mounted to an exposed side 45 of the connecting means 30, as best seen in FIG. 4 and in addition to their guide function, define an upper limit of movement of the connecting means 30, and thus the implement/tool 8 carried thereby. The guide pins 40, 42 are preferably, but not necessarily, spiral roll pins which are wedged into the sleeves 43, 44.

A control/locking means 46 for selectively raising and lowering the implement/tool 8 includes an external handle 48, a first cylindrical rod 50, a cylindrical base portion 52 including a transverse pin 54, and a second cylindrical rod 56 coaxial with the rod 50. The transverse pin 54 is preferably but not necessarily a spiral roll pin. A lower transverse support 58 is welded between a corresponding lower portion of each L-shaped bracket 22, 24, as best seen in FIG. 4. An upper support 60 is mounted to the connecting means 30 adjacent the upper pin 40.

The upper support 60 is fixed with respect to the connecting means 30 and moveable with respect to the L-shaped side brackets 22, 24, while the lower transverse support 58 is fixed with respect to the first and second L-shaped brackets 22, 24, respectively. The lower transverse support 58 and the upper support 60 include first and second holes 64, 66, respectively, for slidably receiving the cylindrical rod 56. A coil spring 68 surrounds the cylindrical rod 56 and is compressed between the lower transverse support 58 and the upper support 60. The spring 68 normally biases the upper support 60 (connected to the connecting means 30) towards a raised position.

The base portion 52 of the locking means 46 rests on the upper support 60. The handle 48 of the locking means 46 is used to selectively rotate the spiral roll pin 54 into and out of a slot 72 in the second L-shaped bracket 24. The slot 72 and pin 54 cooperatively hold the connecting means 30 and implement/tool 8 in the lowered position against the bias of the spring 68, as best seen in FIG. 1. When the height adjusting device 10 is in the lowered position, the upper and lower pins 40, 42, respectively, are adjacent a lower portion of the upper and lower channels 26, 28, respectively, of the first and second L-shaped brackets 22, 24. The spring 68 biases the pin 54 against the slot 72 so that the connecting means 30 remains in the lowered position during use.

When an operator needs to raise the farming implement/tool 8, the operator simply presses down on the handle 48 until the pin 54 clears the slot 72 and then rotates the handle 48 through less than 360° until the pin 54 is out of the slot 72. The spring 68 overcomes the weight of the implement/tool 8 and automatically biases the upper support 60, connecting means 30 and farming implement/tool 8 into the raised position, as seen in FIG. 2. This operation can be effected from a safe location with the handle 48 accessible from above the equipment. A minimal amount of time is required to make this adjustment. The upper and lower pins 40, 42, respectively, are located adjacent an upper portion of the upper and lower channels 26, 28 with the implement/tool 8 raised.

It should be understood that while only two positions are shown in which the implement/tool 8 can be locked, the invention contemplates using the same concept to lock the implement/tool 8 in any number of different positions, with any desired interval between different settings.

FIG. 4 shows a locking means 74 having a circular operating handle 76, and a single cylindrical control rod 78 with upper and lower stoppers 82, 84 respectively, which set the maximum range of movement of the connecting means 30. The operation of the locking means 74 is similar to that described with respect to the locking means 46.

Figure 5:
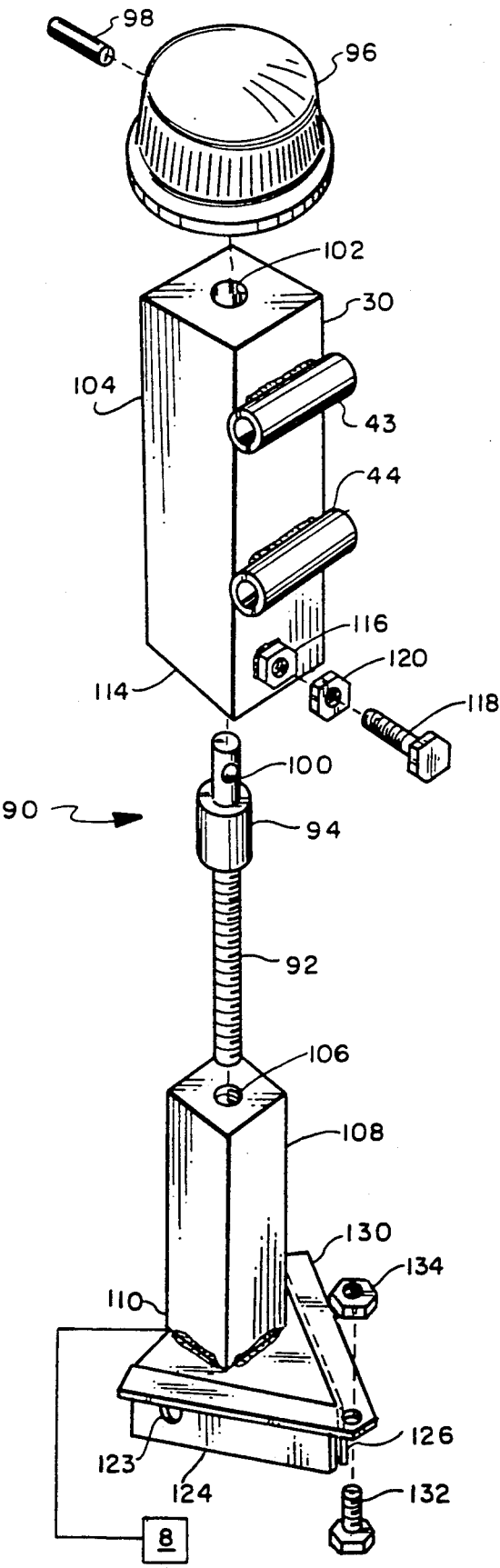
FIG. 5 is an exploded perspective view of the inventive height adjusting mechanism.

FIG. 5 shows the connecting means 30 for the height adjusting device 10 including a fine adjust mechanism 90. The fine adjust mechanism 90 includes a threaded rod 92 having an enlarged base portion 94 which is mounted to a cap 96 with a guide pin 98 extendable through the cap 96 and an aligned hole 100 with the cap 96 operatively positioned. The base portion 94 is received in an unthreaded bore 102 in a top end of a first square tube 104.

The rod 92 threadably engages a nut 106 or threaded bore at one end of a second square tube 108. The second square tube 108 is slidably received within the first square tube 104. An opposite end 110 of the second square tube 108 is connected to the farming implement/tool 8.

The cap 96 is rotated to operate the fine adjust mechanism 90 to vary the height of the farming implement/tool 8. The base portion 94 rotates in the unthreaded mount 102 In the first square tube 104 and the threaded rod 92 rotates in the nut 106 welded in the second square tube 108. The cap 96 is rotated in a first direction to lower the farming implement/tool 8 and in a second direction to raise the farming implement/tool 8. When the cap 96 is rotated, the second square tube 108 moves with respect to the first square to be 104. Since the threaded rod 92 typically has fine threads, the fine adjust mechanism 90 is utilized to finely adjust the height of the farming implement/tool 8 around the raised and lowered position.

The first square tube 104 has an angle cut 114 on one end thereof and a welded nut 116 adjacent the angle cut 114 for receiving a set screw 118. An opposite end of the second square tube 108 is connecting to the farming implement/tool 8. The set screw 118 reduces the clearance between the first and second square tube 104, 108, respectively, to minimize the movement therebetween during operation. A lock nut 120 prevents loosening of the set screw 118.

Once the fine adjustment is made, the implement/tool 8 can be consistently moved and returned to the preselected finely set position. The cap 96 is located adjacent to the handle 48 to allow safe adjustment from the top side of the equipment.

The particular dimension, force of the spring 68, etc. are all selected on a case-by-case basis depending upon the range of height adjustment needed and the weight of the implements/tools. The fine adjustment permits a highly versatile, universal construction.

As previously mentioned, the particular implement/tool employed is not critical to the invention. With the implement tool 8 shown, first and second toothed wheel 36, 38, respectively, are mounted in holes 123 in first and second mounting plates 124, 126, respectively, welded to the opposite end of the second square tube 108. A flange plate 130 fastened to a top side of the first and second mounting plates 124, 126 by a stud 132 and a locking nut 134 scrapes mud, debris, etc. from the toothed wheels to prevent clogging or jamming of the toothed wheels.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A mechanism for adjusting the height of a farm implement/tool of the type to be carried by a drawing vehicle, said adjusting mechanism comprising:

a connecting means for supporting a farm implement/tool in an operative position;

means for guiding sliding movement of the connecting means selectively in substantially a first line between first and second positions corresponding to raised and lowered position for a farm implement/tool carried by the connecting means;

means for mounting the guiding means to one of a drawing vehicle and a support to be carried by a drawing vehicle;

mans for locking the connecting means in one of the first and second positions and for selectively releasing the connecting means to allow the connecting means to be slid into the other of the first and second positions therefor; and means for limiting sliding movement of the connecting means with the connecting means released;

wherein the locking means includes a rotatable shaft on the connecting means and cooperating means on the rotatable shaft and guiding means for locking the connecting means in one of the first and second positions with the shaft in a first rotational position and for allowing the connecting means to slide to the other of the first and second position with the shaft in a second rotational position, said shaft being rotatable about an axis substantially parallel to the first line between the first and second rotational positions for the shaft.

2. The mechanism for adjusting the height of a farm implement/tool according to claim 1 wherein the guiding means guides the connecting means in translation between the first and second positions therefor.

3. The mechanism for adjusting the height of a farm implement/tool according to claim 1 wherein the shaft rotates through less than 360° between the first and second rotational shaft positions.

4. The mechanism for adjusting the height of a farm implement/tool according to claim 1 wherein the cooperating means on the rotatable shaft and guiding means comprises a pin and slot, one each on at least one of the rotatable shaft and connecting means and guiding means.

5. The mechanism for adjusting the height of a farm implement/tool according to claim 1 wherein said mounting means includes a mounting plate and there are first and second brackets extending from said mounting plate to define a path for guiding movement of the connecting means.

6. The mechanism for adjusting the height of a farm implement/tool according to claim 1 wherein said locking means comprises means for locking the connecting means selectively in a plurality of different positions.

7. The mechanism for adjusting the height of a farm implement/tool according to claim 1 further including means for biasing said connecting means towards the one of said first and second positions corresponding to the raised position for a farm implement/tool carried by the connecting means.

8. The mechanism for adjusting the height of a farm implement/tool according to claim 1 wherein the means for locking and releasing comprises means for releasably locking the connecting means in any of at least three different positions.

9. A mechanism for adjusting the height of a farm implement/tool of the type to be carried by a drawing vehicle, said adjusting mechanism comprising:

a connecting means for supporting a farm implement/tool in an operative position;

means for guiding sliding movement of the connecting means selectively between first and second positions corresponding to raised and lowered positions for a farm implement/tool carried by the connecting means;

means for mounting the guiding means to one of a drawing vehicle and a support to be carried by a drawing vehicle;

means for locking the connecting means in one of the first and second positions and for selectively releasing the connecting means to allow the connecting means to be slid into the other of the first and second positions therefor;

means for limiting sliding movement of the connecting means with the connecting means released; and means for normally spring biasing the connecting means to one of the first and second positions therefor.

10. A mechanism for adjusting the height of a farm implement/tool of the type to be carried by a drawing vehicle, said adjusting mechanism comprising:

a connecting means for supporting a farm implement/tool in an operative position;

means for guiding sliding movement of the connecting means selectively between first and second positions corresponding to raised and lowered positions for a farm implement/tool carried by the connecting means;

means for mounting the guiding means to one of a drawing vehicle and a support to be carried by a drawing vehicle; an d means for locking the connecting means in one of the first and second positions and for selectively releasing the connecting means to allow the connecting means to be slid into the other of the first and second positions therefor;

wherein said mounting means includes a mounting plate and there are first and second brackets extending from said mounting plate to define a path for guiding movement of the connecting means, wherein said guiding means includes a slot/channel in at least one of said first and second brackets for receiving a pin on said connecting means, said pin moving guidingly in the slot/channel as the connecting means moves.

11. The mechanism for adjusting the height of a farm implement/tool according to claim 10 wherein said pin is a spiral roll pin.

12. The mechanism for adjusting the height of a farm implement/tool according to claim 10 wherein said guiding means includes at least one additional slot/channel for guidingly receiving a second pin on said connecting means.

13. A mechanism for adjusting the height of a farm implement/tool of the type to be carried by a drawing vehicle, said adjusting mechanism comprising:

a connecting means for supporting a farm implement/tool in an operative position;

means for guiding sliding movement of the connecting means selectively between first and second positions corresponding to raised and lowered positions for a farm implement/tool carried by the connecting means;

means for mounting the guiding means to one of a drawing vehicle and a support to be carried by a drawing vehicle;

means for locking the connecting means in one of the first and second positions and for selectively releasing the connecting means to allow the connecting means to be slid into the other of the first and second positions therefor;

means for limiting sliding movement of the connecting means with the connecting means released; and means for biasing said connecting means towards the one of said first and second positions corresponding to the raised position for a farm implement/tool carried by the connecting means, wherein said mounting means includes first and second brackets, said biasing means includes a lower support attached to at least one of the first and second brackets, a spring resting on said lower support, and an upper support on the connecting means, said spring biasing said upper support to place the connecting means in a position corresponding to the raised position for a farm implement/tool carried by the connecting means.

14. The mechanism for adjusting the height of a farm implement/tool according to claim 13 wherein said locking means includes a cylindrical control rod slidably received in said lower support, said upper support and said spring for movement in a line, said control rod including an upper stopper means for limiting movement of said control rod in a first linear direction and a lower stopper means for limiting movement of said control rod in a second linear direction opposite to said first linear direction.

15. A mechanism for adjusting the height of a farm implement/tool of the type to be carried by a drawing vehicle, said adjusting mechanism comprising:
a connecting means for supporting a farm implement/tool in an operative position;
means for guiding sliding movement of the connecting means selectively between first and second positions corresponding to raised and lowered positions for a farm implement/tool carried by the connecting means;
means for mounting the guiding means to one of a drawing vehicle and a support to be carried by a drawing vehicle;
means for locking the connecting means in one of the first and second positions and for selectively releasing the connecting means to allow the connecting means to be slid into the other of the first and second positions therefor; and
means for limiting sliding movement of the connecting means with the connecting means release,
there further being adjusting means on the connecting means for selectively adjusting the position of an implement/tool relative to the connecting means.

16. A mechanism for adjusting the height of a farm implement/tool of the type to be carried by a drawing vehicle, said adjusting mechanism comprising:
a connecting means for supporting a farm implement/tool in an operative position;
means for guiding sliding movement of the connecting means selectively between first and second positions corresponding to raised and lowered positions for a farm implement/tool carried by the connecting means;
means for mounting the guiding means to one of a drawing vehicle and a support to be carried by a drawing vehicle;
means for locking the connecting means in one of the first and second positions and for selectively releasing the connecting means to allow the connecting means to be slid into the other of the first and second positions therefor;
means for limiting sliding movement of the connecting means with the connecting means released; and
means on the connecting means for fine adjusting the position of an implement/tool carried by the connecting means relative to the connecting means, said fine adjusting means including:
a threaded rod with spaced ends and a cap on one end thereof;
a first elongate tube with spaced ends and having a connecting means at one end thereof for receiving the one end of the threaded rod, a portion of the one end of the threaded rod extending from the one end of the first tube for engagement with the cap; and
a second elongate tube slidably received in the first tube and threaded to accept the threaded rod, there being means at the other end of the second tube for connecting to an implement/tool,
whereby rotation of the cap changes the height of an implement/tool on the second elongate tube.

17. The mechanism for adjusting the height of a farm implement/tool according to claim 16 further including a means for selectively fixing the relative positions of the first and second tubes.

18. The mechanism for adjusting the height of a farm implement/tool according to claim 17 wherein the fixing means includes an adjustable set screw.

19. A mechanism for adjusting the height of a farm implement/tool of the type to be carried by a drawing vehicle, said adjusting mechanism comprising:
a connecting means for supporting a farm implement/tool in an operative position;
means for guiding sliding movement of the connecting means selectively between first and second positions corresponding to raised and lowered positions for a farm implement/tool carried by the connecting means;
means for mounting the guiding means to one of a drawing vehicle and a support to be carried by a drawing vehicle;
and
means for locking the connecting means in the other of the first and second positions therefor,
said locking means including a movable shaft that is connected to the connecting means to follow the path of movement of the connecting means as the connecting means is moved between its first and second positions and a pin and slot connection that is selectively connected and disconnected by movement of the movable shaft.

20. The mechanism for adjusting the height of a farm implement/tool according to claim 19 wherein the movable shaft is rotatable relative to the connecting means between first and second positions to connect and disconnect the pin and slot connection.

21. The mechanism for adjusting the height of a farm implement/tool according to claim 20 wherein the movable shaft is rotated through less than 360° between the first and second positions therefor.

22. The mechanism for adjusting the height of a farm implement/tool according to claim 19 wherein the connecting means includes a fine adjusting means for controlling the position of an implement/tool carried by the connecting means.

23. A mechanism for adjusting the height of a farm implement/tool of the type to be carried by a drawing vehicle, said adjusting mechanism comprising:
a connecting means for supporting a farm implement/tool in an operative position;
means for guiding sliding movement of the connecting means selectively between first and second positions corresponding to raised and lowered positions for a farm implement/tool carried by the connecting means;
means for mounting the guiding means to one of a drawing vehicle and a support to be carried by a drawing vehicle; and
means for locking the connecting means in one of the first and second positions and for selectively releasing the connecting means to allow the connecting means to be slid into the other of the first and second positions therefor,
wherein the locking means includes a shaft on the connecting means rotatable about a first axis and cooperating means on the rotatable shaft and guiding means for locking the connecting means in one of the first and second positions with the shaft in a first rotational position and for allowing the connecting means to slide to the other of the first and second positions with the shaft in a second rotational position, said rotatable shaft being movable between its first and second rotational positions without movement of the shaft axially relative to the first axis.

24. An apparatus for independently adjusting the height of a plurality of farm implements/tools of the type to be carried by a drawing vehicle, said apparatus comprising:

a plurality of connecting means for supporting a plurality of farm implements/tools, one each in an operative position;

means for guiding sliding movement of the connecting means each independently of the other selectively between first and second positions corresponding to raised and lowered positions for a farm implement/tool carried by each of the connecting means;

means for mounting the guiding means to one of a drawing vehicle and a support to be carried by a drawing vehicle; and means on at least one of the connecting means and guiding means movable between separate positions for selectively locking the one connecting means in one of the first and second positions and releasing the one connecting means to allow the one connecting means to be slid into the other of the first and second positions therefor without moving any of the other of the plurality of connecting means.

25. The apparatus for adjusting the height of a plurality of farm implements/tools according to claim 24 wherein each said connecting means has an elongate, horizontally extending handle at the top of the connecting means that is rotatable to selectively lock and release the connecting means.

* * * * *